US012613096B2

(12) United States Patent
Lisoski et al.

(10) Patent No.: US 12,613,096 B2
(45) Date of Patent: Apr. 28, 2026

(54) METHOD OF FLIGHT PLAN OPTIMIZATION OF A HIGH ALTITUDE LONG ENDURANCE AIRCRAFT

(71) Applicant: AEROVIRONMENT, INC., Arlington, VA (US)

(72) Inventors: Derek Lisoski, Simi Valley, CA (US); Bart Dean Hibbs, Simi Valley, CA (US)

(73) Assignee: AeroVironment, Inc., Arlington, VA (US)

( * ) Notice: Subject to any disclaimer, the term of this patent is extended or adjusted under 35 U.S.C. 154(b) by 218 days.

(21) Appl. No.: 17/605,910

(22) PCT Filed: Apr. 23, 2020

(86) PCT No.: PCT/US2020/029654
§ 371 (c)(1),
(2) Date: Oct. 22, 2021

(87) PCT Pub. No.: WO2020/263393
PCT Pub. Date: Dec. 30, 2020

(65) Prior Publication Data
US 2022/0212789 A1    Jul. 7, 2022

Related U.S. Application Data

(60) Provisional application No. 62/854,738, filed on May 30, 2019, provisional application No. 62/838,783, (Continued)

(51) Int. Cl.
*G01C 21/20* (2006.01)
*B64U 101/00* (2023.01)

(52) U.S. Cl.
CPC .......... *G01C 21/20* (2013.01); *B64U 2101/00* (2023.01); *B64U 2201/20* (2023.01)

(58) Field of Classification Search
CPC .. B64C 39/024; B64U 2201/20; G01C 21/20; G05D 1/0204; G05D 1/00–1/87; (Continued)

(56) References Cited

U.S. PATENT DOCUMENTS 2,405,544 A    8/1946    Anjeskey
2,431,589 A    11/1947    Shuler
(Continued)

FOREIGN PATENT DOCUMENTS

AU    2007200943 A1    9/2007
CN    108820230 A    11/2018
(Continued)

OTHER PUBLICATIONS

Fayyaz Muhammad et al.: "Survey and future directions of fault-tolerant distributed computing on board spacecraft", Advances in Space Research, Elsevier, Amsterdam, NL, vol. 58, No. 11, Aug. 22, 2016 (Aug. 22, 2016), pp. 2352-2375, XP029801074, ISSN: 0273-1177, DOI: 10.1016/J.ASR.2016.08.017*p. 2354, section 2.2p. 2355, Fig. 1 and left column 2nd paragraphp. 2360-2361:section 4.2.1.*

(Continued)

*Primary Examiner* — Mohamed Abdo Algehaim
(74) *Attorney, Agent, or Firm* — Command IP LLP; Pejman Yedidsion; Eric Aagaard

(57)    ABSTRACT

Systems, devices, and methods including: at least one unmanned aerial vehicle (UAV); at least one flight control computer (FCC) associated with each UAV, where the FCC controls movement of each UAV; at least one computing device associated with a ground control station; where the at least one FCC maintains a first flight pattern of a respective UAV of the at least one UAV above the ground control station; where the at least one computing device is configured to transmit a transition signal to the at least one FCC to (Continued)

transition the respective UAV of the at least one UAV from the first flight pattern to a second flight pattern in response to a wind speed exceeding a set threshold relative to a flight speed of the respective UAV of the at least one UAV.

8 Claims, 11 Drawing Sheets

Related U.S. Application Data filed on Apr. 25, 2019, provisional application No. 62/838,833, filed on Apr. 25, 2019.

(58) Field of Classification Search
CPC . G05D 1/20–1/249; G05D 1/40–1/498; G05D 1/60–1/6987; G05D 2101/00–2101/26; G05D 2103/00; G05D 2105/00–2105/93; G05D 2107/00–2107/95; G05D 2109/00–2109/50; G05D 2111/00–2111/67
USPC .............................................................. 701/2
See application file for complete search history.

(56) References Cited

U.S. PATENT DOCUMENTS

| | | | |
|---|---|---|---|
| 2,478,758 A | 8/1949 | Frieder et al. | |
| 2,712,874 A | 7/1955 | Murray | |
| 2,815,132 A | 12/1957 | Ben | |
| 2,898,058 A | 8/1959 | Del | |
| 3,012,737 A | 12/1961 | Dodd | |
| 3,306,578 A | 2/1967 | Meeks et al. | |
| 3,640,491 A | 2/1972 | Harrison | |
| 3,671,013 A | 6/1972 | Everson, Jr. et al. | |
| 4,269,374 A | 5/1981 | Miller | |
| 4,440,265 A | 4/1984 | Spagnoli | |
| 4,461,455 A | 7/1984 | Mills et al. | |
| 4,810,151 A | 3/1989 | Shem | |
| 4,916,612 A | 4/1990 | Chin et al. | |
| 5,175,712 A | 12/1992 | Vaccaro et al. | |
| 5,349,654 A | 9/1994 | Bond et al. | |
| 5,383,758 A | 1/1995 | Patrick | |
| 5,552,985 A | 9/1996 | Hori | |
| 5,662,315 A | 9/1997 | Neiss et al. | |
| 5,810,284 A | 9/1998 | Hibbs et al. | |
| 5,903,717 A | 5/1999 | Wardrop | |
| 6,024,348 A | 2/2000 | Ventura et al. | |
| 6,056,237 A | 5/2000 | Woodland | |
| 6,314,630 B1 | 11/2001 | Munk et al. | |
| 6,550,018 B1 | 4/2003 | Abonamah et al. | |
| 6,684,275 B1 | 1/2004 | Goldstein | |
| 6,697,973 B1 | 2/2004 | Baumeister, IV et al. | |
| 6,808,143 B2 | 10/2004 | Munk et al. | |
| 6,979,288 B2 | 12/2005 | Hazlehurst et al. | |
| 7,319,738 B2 | 1/2008 | Lasiuk et al. | |
| 7,461,711 B2 | 12/2008 | McCrary et al. | |
| 7,874,053 B2 | 1/2011 | Stangel | |
| 7,917,242 B2 | 3/2011 | Jones | |
| 8,005,563 B2 | 8/2011 | Cobb et al. | |
| 8,020,816 B2 | 9/2011 | Laitila et al. | |
| 8,066,267 B2 | 11/2011 | Schaerer | |
| 8,141,819 B2 | 3/2012 | Brock | |
| 8,191,831 B2 | 6/2012 | Nadir | |
| 8,262,050 B2 | 9/2012 | Linz | |
| 8,577,519 B1 | 11/2013 | Varnavas et al. | |
| 8,661,684 B1 | 3/2014 | Boyd et al. | |
| 8,948,960 B2 | 2/2015 | Griffith | |
| 9,126,698 B2 | 9/2015 | Spinazze et al. | |
| 9,486,917 B2 | 11/2016 | Reid et al. | |
| 9,527,605 B1 * | 12/2016 | Gentry ................. G05D 1/0094 | |
| 9,654,200 B2 | 5/2017 | Mazzarella et al. | |
| 9,694,894 B2 | 7/2017 | Deakin | |
| 9,708,079 B2 | 7/2017 | DesJardien et al. | |
| 9,776,330 B2 | 10/2017 | Day et al. | |
| 9,895,741 B2 | 2/2018 | Oberoi et al. | |
| 9,957,064 B2 | 5/2018 | Miller et al. | |
| 9,959,773 B2 | 5/2018 | Raptopoulos et al. | |
| 10,005,541 B2 | 6/2018 | Karem et al. | |
| 10,017,277 B2 | 7/2018 | DesJardien et al. | |
| 10,095,242 B1 | 10/2018 | Novak | |
| 10,155,588 B2 | 12/2018 | Fisher et al. | |
| 10,391,543 B2 | 8/2019 | Boyd et al. | |
| 10,407,087 B1 | 9/2019 | Baker et al. | |
| 10,427,254 B2 | 10/2019 | Day et al. | |
| 10,476,296 B1 | 11/2019 | Rausch et al. | |
| 10,640,297 B2 | 5/2020 | Kilibarda et al. | |
| 10,894,617 B2 | 1/2021 | Liaqat et al. | |
| 10,907,764 B2 | 2/2021 | Waller et al. | |
| 10,982,805 B2 | 4/2021 | Burton et al. | |
| 11,180,264 B2 | 11/2021 | Best et al. | |
| 2003/0183451 A1 | 10/2003 | Huang | |
| 2005/0034015 A1 | 2/2005 | Hashimoto et al. | |
| 2005/0044700 A1 | 3/2005 | Ghuman et al. | |
| 2005/0116105 A1 | 6/2005 | Munk et al. | |
| 2006/0266885 A1 | 11/2006 | Hardaker et al. | |
| 2006/0278757 A1 | 12/2006 | Kelleher | |
| 2007/0131103 A1 | 6/2007 | McClellan et al. | |
| 2007/0168711 A1 | 7/2007 | Chen | |
| 2008/0033604 A1 | 2/2008 | Margolin | |
| 2009/0044050 A1 | 2/2009 | Maimone et al. | |
| 2009/0236470 A1 | 9/2009 | Goossen et al. | |
| 2010/0004798 A1 | 1/2010 | Bodin et al. | |
| 2010/0168939 A1 | 7/2010 | Doeppner et al. | |
| 2010/0217437 A1 | 8/2010 | Sarh et al. | |
| 2010/0292873 A1 * | 11/2010 | Duggan ............... G05D 1/0061 | |
| | | | 701/11 |
| 2011/0000082 A1 | 1/2011 | Yamashita et al. | |
| 2011/0024587 A1 | 2/2011 | Tsai | |
| 2011/0054694 A1 | 3/2011 | Munk | |
| 2012/0072058 A1 | 3/2012 | Regmi | |
| 2012/0110374 A1 | 5/2012 | Brewerton et al. | |
| 2012/0216384 A1 | 8/2012 | Immekus | |
| 2012/0273631 A1 | 11/2012 | Deros | |
| 2013/0062457 A1 | 3/2013 | Deakin | |
| 2013/0135030 A1 | 5/2013 | Barrenscheen et al. | |
| 2013/0158697 A1 | 6/2013 | Stone et al. | |
| 2014/0001318 A1 | 1/2014 | Ehrenleitner | |
| 2014/0021288 A1 | 1/2014 | Elson et al. | |
| 2014/0032034 A1 | 1/2014 | Raptopoulos et al. | |
| 2014/0188776 A1 | 7/2014 | Shuster et al. | |
| 2014/0257684 A1 * | 9/2014 | Wilder ..................... G08G 5/55 | |
| | | | 701/120 |
| 2014/0316616 A1 * | 10/2014 | Kugelmass ............ G05D 1/104 | |
| | | | 701/8 |
| 2014/0353894 A1 | 12/2014 | DesJardien et al. | |
| 2015/0066248 A1 * | 3/2015 | Arbeit .................... G08G 5/006 | |
| | | | 701/2 |
| 2015/0097071 A1 | 4/2015 | Frolov et al. | |
| 2015/0097079 A1 * | 4/2015 | Frolov .................. B64C 39/024 | |
| | | | 290/55 |
| 2015/0102172 A1 | 4/2015 | Thurn | |
| 2015/0115106 A1 | 4/2015 | Coffey et al. | |
| 2015/0203200 A1 | 7/2015 | Bye et al. | |
| 2015/0266575 A1 | 9/2015 | Borko | |
| 2015/0314741 A1 | 11/2015 | Ueta et al. | |
| 2015/0327136 A1 | 11/2015 | Kim et al. | |
| 2015/0336671 A1 * | 11/2015 | Winn ................... G05D 1/0202 | |
| | | | 701/3 |
| 2016/0009390 A1 * | 1/2016 | Kugelmass ............ H04L 67/12 | |
| | | | 701/3 |
| 2016/0009402 A1 | 1/2016 | Hunter | |
| 2016/0039541 A1 | 2/2016 | Beardsley et al. | |
| 2016/0075452 A1 | 3/2016 | Robles et al. | |
| 2016/0202701 A1 | 7/2016 | Burte | |
| 2016/0244152 A1 | 8/2016 | Coffman | |
| 2016/0257426 A1 | 9/2016 | Mozer | |
| 2016/0292696 A1 * | 10/2016 | Gong ....................... G08G 5/76 | |
| 2016/0307448 A1 | 10/2016 | Salnikov et al. | |
| 2016/0347467 A1 * | 12/2016 | Salesse-Lavergne ........................ | |
| | | | B64C 13/0421 |
| 2016/0368590 A1 | 12/2016 | Karem et al. | |
| 2017/0069214 A1 | 3/2017 | Dupray et al. | |

(56)          References Cited

U.S. PATENT DOCUMENTS

| | | | |
|---|---|---|---|
| 2017/0120443 A1 | 5/2017 | Kang et al. | |
| 2017/0137138 A9 | 5/2017 | Hunter | |
| 2017/0144776 A1 | 5/2017 | Fisher et al. | |
| 2017/0195048 A1 | 7/2017 | Sham | |
| 2017/0248125 A1* | 8/2017 | Luchsinger | F03D 9/32 |
| 2017/0269594 A1* | 9/2017 | Sydnor | G05D 1/0011 |
| 2017/0334559 A1* | 11/2017 | Bouffard | G08G 5/0034 |
| 2017/0351254 A1* | 12/2017 | Listwin | B64C 39/024 |
| 2018/0009764 A1 | 1/2018 | Mitchell et al. | |
| 2018/0032090 A1* | 2/2018 | Vander Lind | G05D 1/104 |
| 2018/0032091 A1* | 2/2018 | Vander Lind | G05D 1/104 |
| 2018/0048160 A1 | 2/2018 | Narla et al. | |
| 2018/0068567 A1* | 3/2018 | Gong | H04W 4/022 |
| 2018/0090016 A1* | 3/2018 | Nishi | G08G 5/0091 |
| 2018/0099764 A1 | 4/2018 | Schill et al. | |
| 2018/0130363 A1 | 5/2018 | Yvetot et al. | |
| 2018/0273170 A1 | 9/2018 | D'Sa et al. | |
| 2018/0305191 A1 | 10/2018 | Renquist | |
| 2018/0362158 A1 | 12/2018 | Zhang et al. | |
| 2019/0107408 A1 | 4/2019 | Stroman et al. | |
| 2019/0161190 A1* | 5/2019 | Gil | E05F 15/77 |
| 2019/0300185 A1* | 10/2019 | Tang | B64C 13/20 |
| 2019/0377021 A1 | 12/2019 | Bhalwankar et al. | |
| 2019/0378419 A1 | 12/2019 | Gansmandel et al. | |
| 2019/0389602 A1 | 12/2019 | Schilling | |
| 2020/0092052 A1 | 3/2020 | MacAfee et al. | |
| 2020/0094991 A1 | 3/2020 | Datas et al. | |
| 2020/0101571 A1 | 4/2020 | Datas et al. | |
| 2020/0172267 A1 | 6/2020 | Darbonville et al. | |
| 2020/0307780 A1 | 10/2020 | Worsham, II | |
| 2021/0061027 A1 | 3/2021 | Da et al. | |
| 2021/0064063 A1* | 3/2021 | Wakikawa | H04W 24/04 |
| 2021/0072772 A1* | 3/2021 | Miyakawa | H04B 7/18506 |
| 2021/0080285 A1* | 3/2021 | Connor | G01C 21/10 |
| 2021/0091848 A1* | 3/2021 | Cai | H01Q 1/28 |
| 2021/0258067 A1* | 8/2021 | Hoshino | H01Q 21/20 |
| 2021/0319705 A1* | 10/2021 | Furumoto | G08G 5/0091 |
| 2022/0348356 A1 | 11/2022 | Millspaugh | |
| 2024/0417105 A1 | 12/2024 | Millspaugh | |

FOREIGN PATENT DOCUMENTS

| | | | |
|---|---|---|---|
| DE | 102017102481 A1 | 8/2018 |
| EP | 0575854 A2 | 12/1993 |
| EP | 0590637 A1 | 4/1994 |
| EP | 2949516 A1 | 12/2015 |
| JP | H03137732 A | 6/1991 |
| JP | H0588926 A | 4/1993 |
| JP | 2001102801 A | 4/2001 |
| JP | 2004130852 A | 4/2004 |
| JP | 2005145090 A | 6/2005 |
| JP | 2008207705 A | 9/2008 |
| JP | 2019054490 A | 4/2020 |
| WO | 2017083406 A1 | 5/2017 |
| WO | 2017130137 A1 | 8/2017 |
| WO | 2017197245 A1 | 11/2017 |
| WO | 2018234799 A1 | 12/2018 |

OTHER PUBLICATIONS

Abraham et al, "Dynamic Optimization of High-Altitude Solar Aircraft Trajectories Under Station-Keeping Constraints", Journal of Guidance and Control and Dynamics, vol. 42, No. 3, Nov. 26, 2018, pp. 538-552.

Hosseini Saghar et al.: "Optimal path planning and power allocation for a long endurance solar-powered UAV", 2015 American Control Conference (ACC), IEEE, Jun. 17, 2013 (Jun. 17, 2013), pp. 2588-2593, XP032476633, ISSN: 0743-1619, DOI: 10.1109/ACC. 2013.6580224 [retrieved on Aug. 14, 2013] *p. 2589-p. 2592*.

Lee Joo-Seok et al.: Flight path optimization of solar powered UAV for endurance flight, 2015 54th Annual Conference of the Society of Instrument and Control Engineers of Japan( (SICE), The Society of Instrument and Control Engineers—SICE, Jul. 28, 2015 (Jul. 28, 2015), pp. 820-823, XP033220597, DOI:10.1109/SICE.2015. 7285496 [retrieved on Sep. 30, 2015] *whole document*.

International Search Report for PCT/US20/029654 mailed on Jan. 12, 2021.

Tomoshiba Yasuda, Jet Engine Digital Control System for Aircraft, Information Processing Society of Japan Research Report, vol. 91, No. 109, Japan, Information Processing Society of Japan, Dec. 12, 1991, 1-8.

* cited by examiner

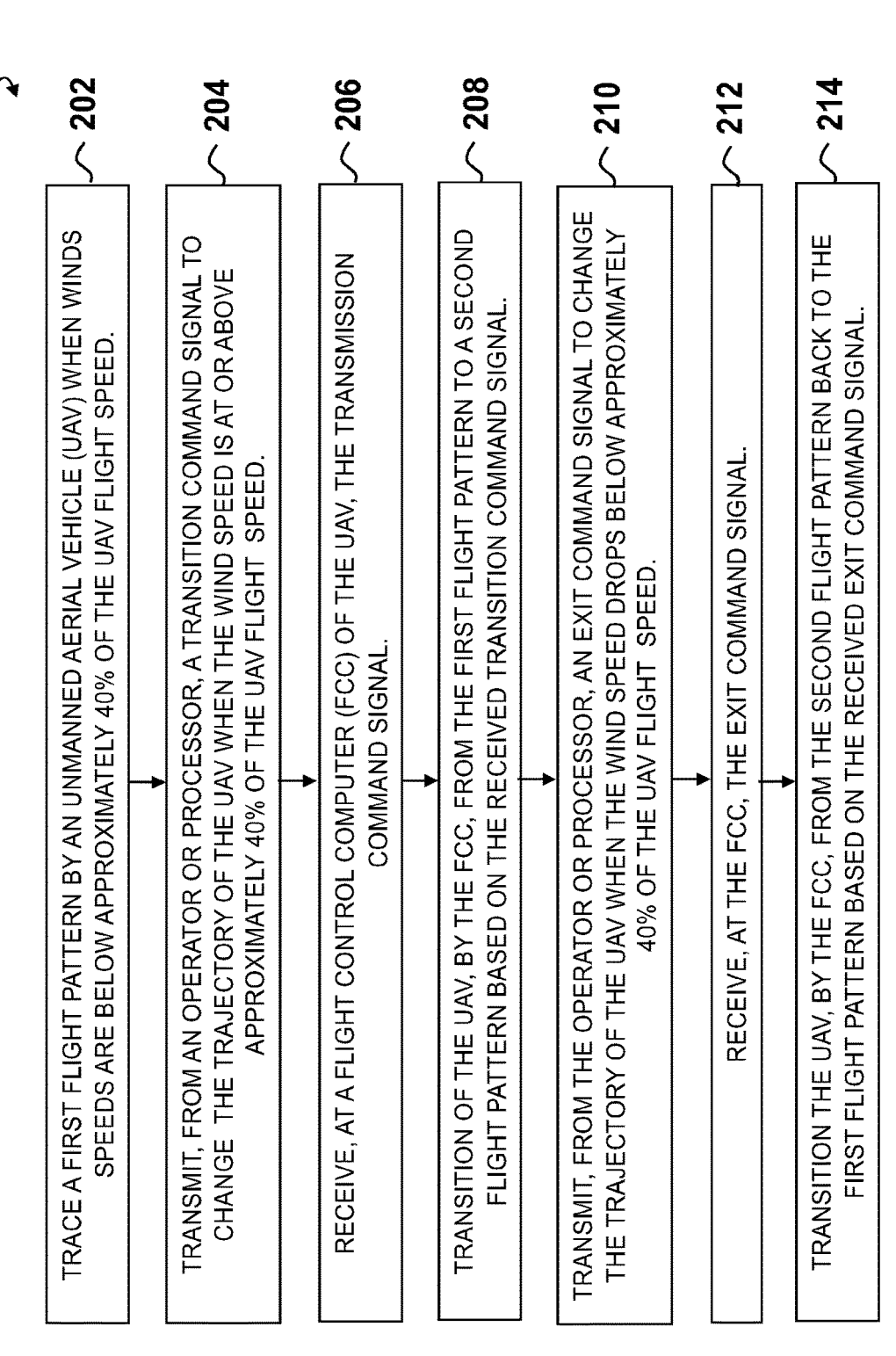

200

TRACE A FIRST FLIGHT PATTERN BY AN UNMANNED AERIAL VEHICLE (UAV) WHEN WINDS SPEEDS ARE BELOW APPROXIMATELY 40% OF THE UAV FLIGHT SPEED.     202

TRANSMIT, FROM AN OPERATOR OR PROCESSOR, A TRANSITION COMMAND SIGNAL TO CHANGE THE TRAJECTORY OF THE UAV WHEN THE WIND SPEED IS AT OR ABOVE APPROXIMATELY 40% OF THE UAV FLIGHT SPEED.     204

RECEIVE, AT A FLIGHT CONTROL COMPUTER (FCC) OF THE UAV, THE TRANSMISSION COMMAND SIGNAL.     206

TRANSITION OF THE UAV, BY THE FCC, FROM THE FIRST FLIGHT PATTERN TO A SECOND FLIGHT PATTERN BASED ON THE RECEIVED TRANSITION COMMAND SIGNAL.     208

TRANSMIT, FROM THE OPERATOR OR PROCESSOR, AN EXIT COMMAND SIGNAL TO CHANGE THE TRAJECTORY OF THE UAV WHEN THE WIND SPEED DROPS BELOW APPROXIMATELY 40% OF THE UAV FLIGHT SPEED.     210

RECEIVE, AT THE FCC, THE EXIT COMMAND SIGNAL.     212

TRANSITION THE UAV, BY THE FCC, FROM THE SECOND FLIGHT PATTERN BACK TO THE FIRST FLIGHT PATTERN BASED ON THE RECEIVED EXIT COMMAND SIGNAL.     214

METHOD OF FLIGHT PLAN OPTIMIZATION OF A HIGH ALTITUDE LONG ENDURANCE AIRCRAFT

CROSS-REFERENCE TO RELATED APPLICATION

This application is a 35 U.S.C § 371 National Stage Entry of International Application No. PCT/US2020/029654, filed Apr. 23, 2020, which claims priority to and the benefit of U.S. Provisional Patent Application No. 62/838,783, filed Apr. 25, 2019, U.S. Provisional Patent Application No. 62/838,833, filed Apr. 25, 2019, and U.S. Provisional Patent Application No. 62/854,738, filed May 30, 2019, the contents of all of which are hereby incorporated by reference herein for all purposes.

FIELD OF ENDEAVOR

The invention relates generally to Unmanned Aerial Vehicles (UAVs), and more particularly to flight patterns for UAVs.

BACKGROUND

Unmanned aerial vehicles (UAVs), such as a High Altitude Long Endurance aircraft, are lightweight planes that are capable of controlled, sustained flight. UAVs may be associated with ground-based operators for two-way communications. Generally speaking, a UAV may fly in large, sweeping pattern over a ground station, taking advantage of wind patterns.

SUMMARY

A system embodiment may include: at least one unmanned aerial vehicle (UAV); at least one flight control computer (FCC) associated with each UAV of the at least one UAV, where the FCC controls movement of each UAV of the at least one UAV; at least one computing device associated with a ground control station, where the at least one computing device may be in communication with the at least one FCC; where the at least one FCC maintains a first flight pattern of a respective UAV of the at least one UAV above the ground control station; where the at least one computing device may be configured to transmit a transition signal to the at least one FCC to transition the respective UAV of the at least one UAV from the first flight pattern to a second flight pattern in response to a wind speed exceeding a set threshold relative to a flight speed of the respective UAV of the at least one UAV.

In additional system embodiments, the FCC may be further configured to transition the respective UAV of the at least one UAV from the first flight pattern to the second flight pattern by generating a connecting flight path between the first flight pattern and the second flight pattern. In additional system embodiments, the connecting flight path allows for a constant turn rate over most of the connecting flight path. In additional system embodiments, the connecting flight path allows for gradual banking maneuvers over most of the connecting flight path.

In additional system embodiments, the first flight pattern and the second flight pattern may be station keeping patterns over the ground control station. In additional system embodiments, where the first flight pattern may be a D-loop flight pattern. In additional system embodiments, the second flight pattern may be a figure-eight flight pattern. In additional system embodiments, the transition signal comprises a set of spatial coordinates for the FCC of the respective UAV of the at least one UAV to follow.

In additional system embodiments, the at least one computing device may be configured to transmit an exit command signal to the at least one FCC to transition the respective UAV of the at least one UAV from the second flight pattern to the first flight pattern in response to a wind speed falling below the set threshold relative to the flight speed of the respective UAV of the at least one UAV. In additional system embodiments, the exit command signal comprises a set of spatial coordinates for the FCC of the respective UAV of the at least one UAV to follow.

A method embodiment may include: maintaining, by at least one flight control computer (FCC) associated with each unmanned aerial vehicle (UAV) of one or more UAVs, a first flight pattern above a ground control station, where the FCC controls movement of each UAV of the at least one UAV; determining a wind speed relative to a set threshold, where the set threshold may be relative to a flight speed of the respective UAV of the at least one UAV; transmitting, by at least one computing device associated with the ground control station, a transition signal to the at least one FCC in response to the determined wind speed exceeding the set threshold; and transitioning, by the at least one FCC associated with the respective UAV of the one or more UAVs, the respective UAV from the first flight pattern to a second flight pattern.

In additional method embodiments, transitioning the respective UAV from the first flight pattern to the second flight pattern further comprises: generating, by the at least one FCC associated with the respective UAV of the one or more UAVs, a connecting flight path between the first flight pattern and the second flight pattern. In additional method embodiments, the connecting flight path allows for a constant turn rate over most of the connecting flight path. In additional method embodiments, the connecting flight path allows for gradual banking maneuvers over most of the connecting flight path.

In additional method embodiments, the first flight pattern and the second flight pattern may be station keeping patterns over the ground control station. In additional method embodiments, the first flight pattern may be a D-loop flight pattern. In additional method embodiments, the second flight pattern may be a figure-eight flight pattern. In additional method embodiments, the transition signal comprises a set of spatial coordinates for the FCC of the respective UAV of the at least one UAV to follow.

Additional method embodiments may further include: transmitting, by the at least one computing device associated with the ground control station, an exit command signal to the at least one FCC in response to the determined wind speed falling below the set threshold; and transitioning, by the at least one FCC associated with the respective UAV of the one or more UAVs, the respective UAV from the second flight pattern to the first flight pattern. In additional method embodiments, the exit command signal comprises a set of spatial coordinates for the FCC of the respective UAV of the at least one UAV to follow.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodi-

Figure 1:
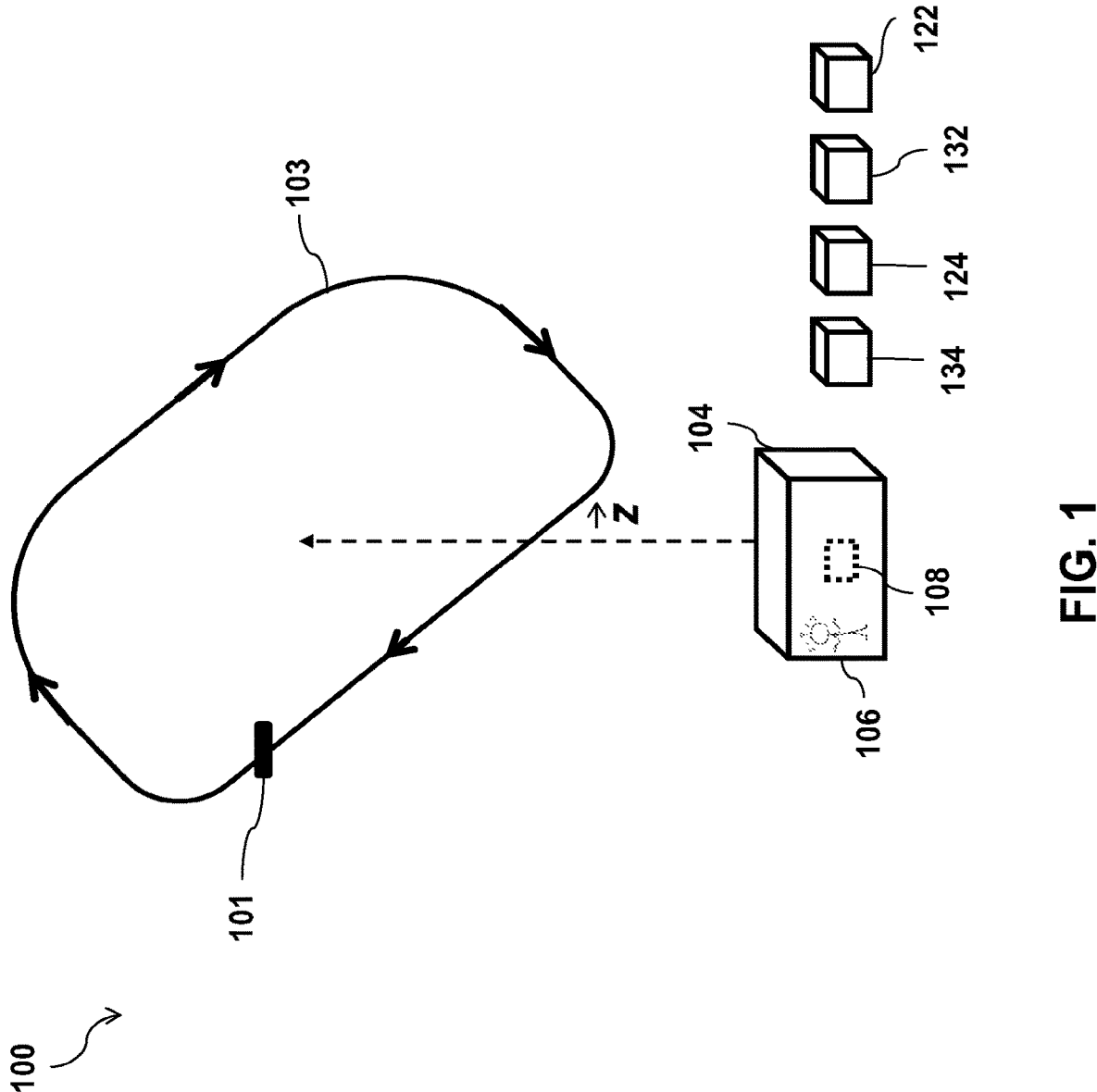
Figure 2:
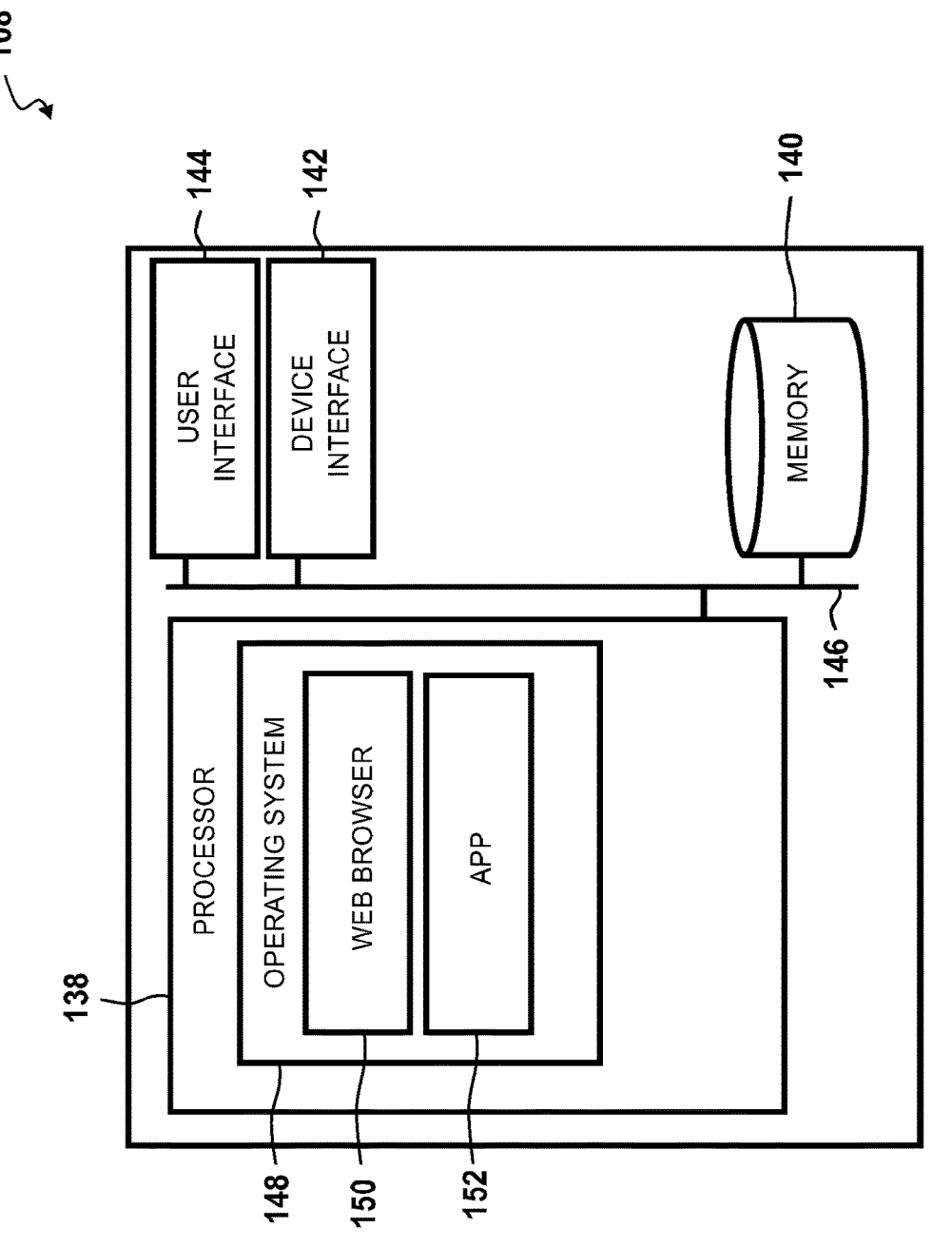
Figure 3:
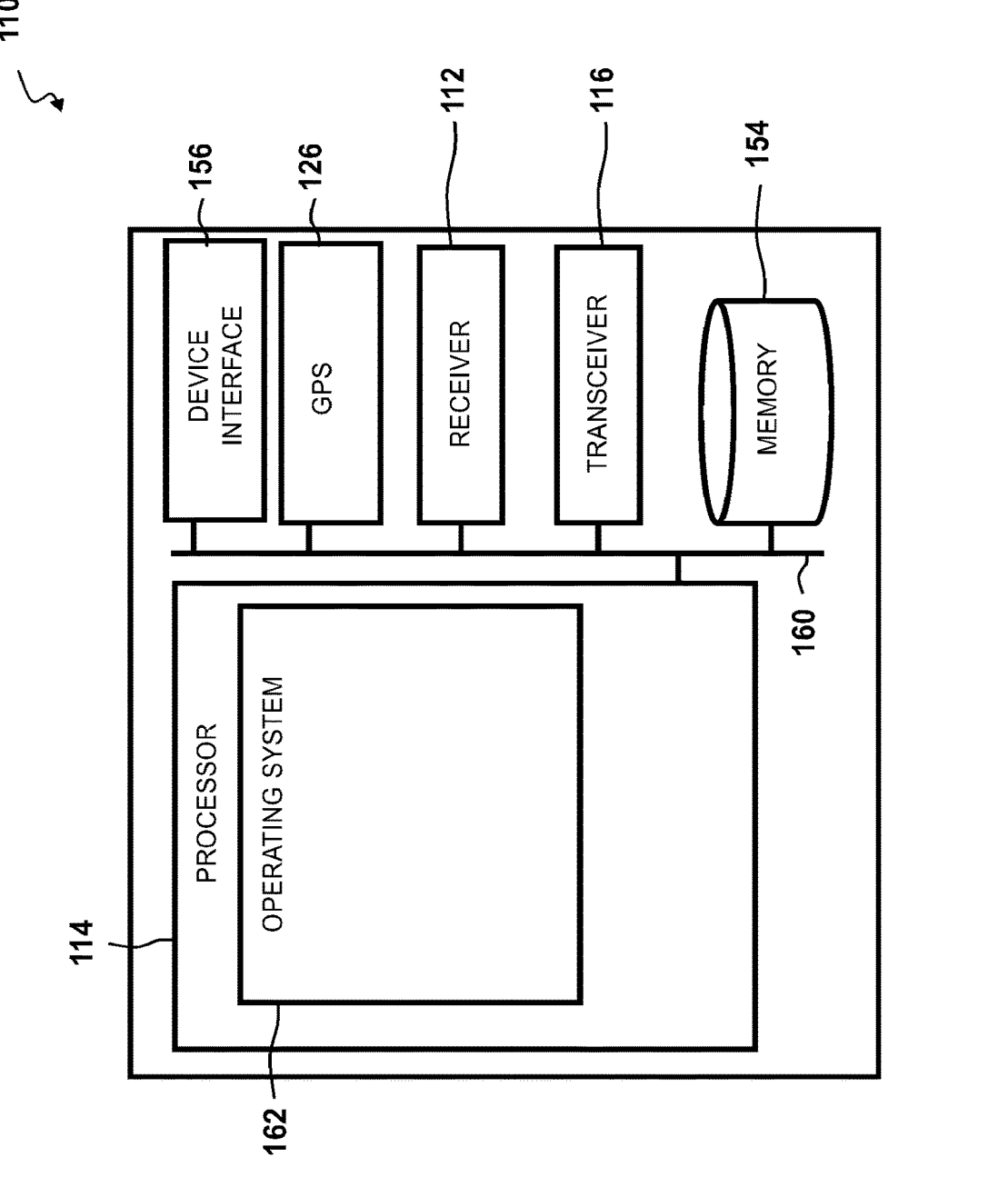
Figure 4:
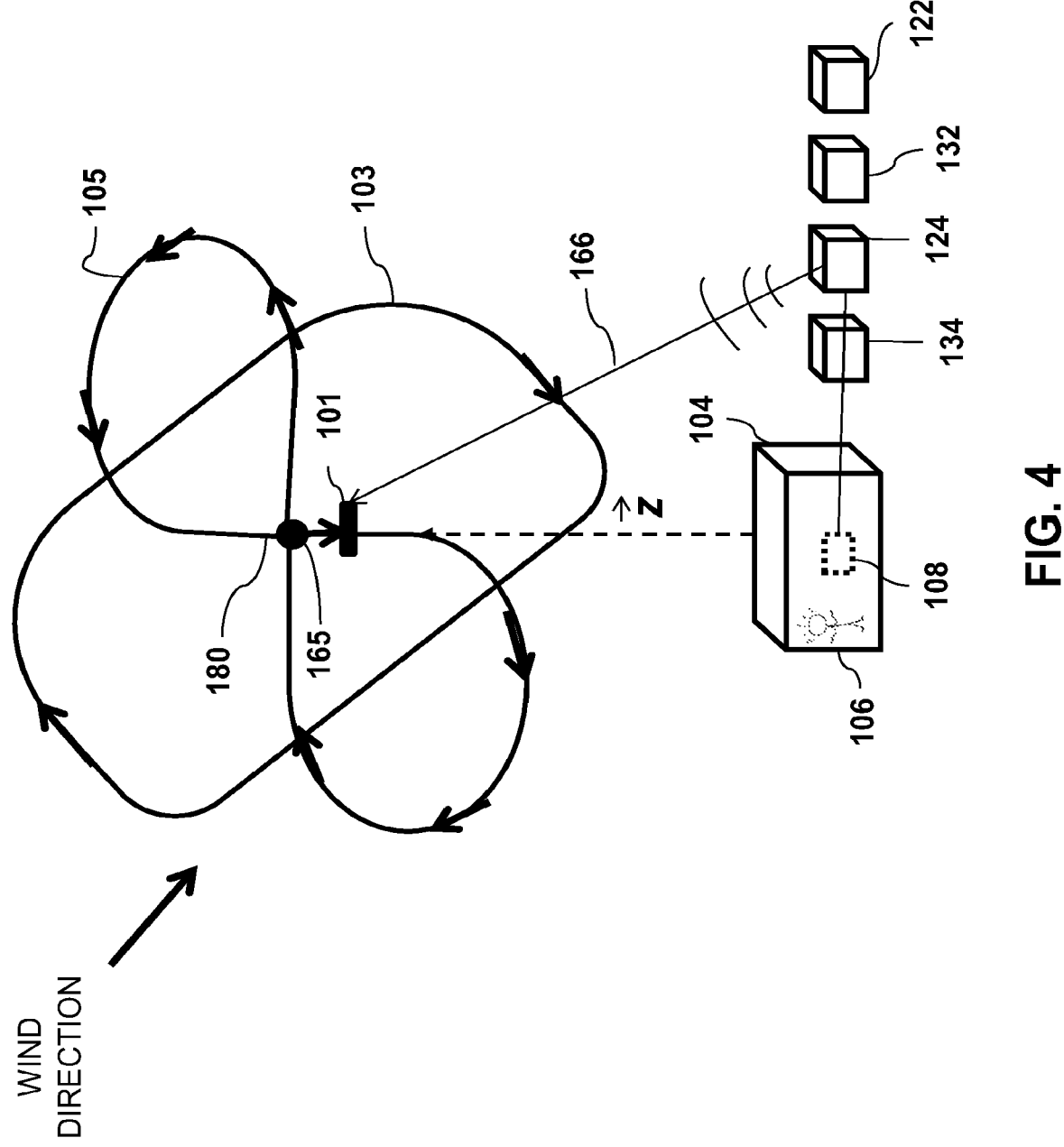
Figure 5:
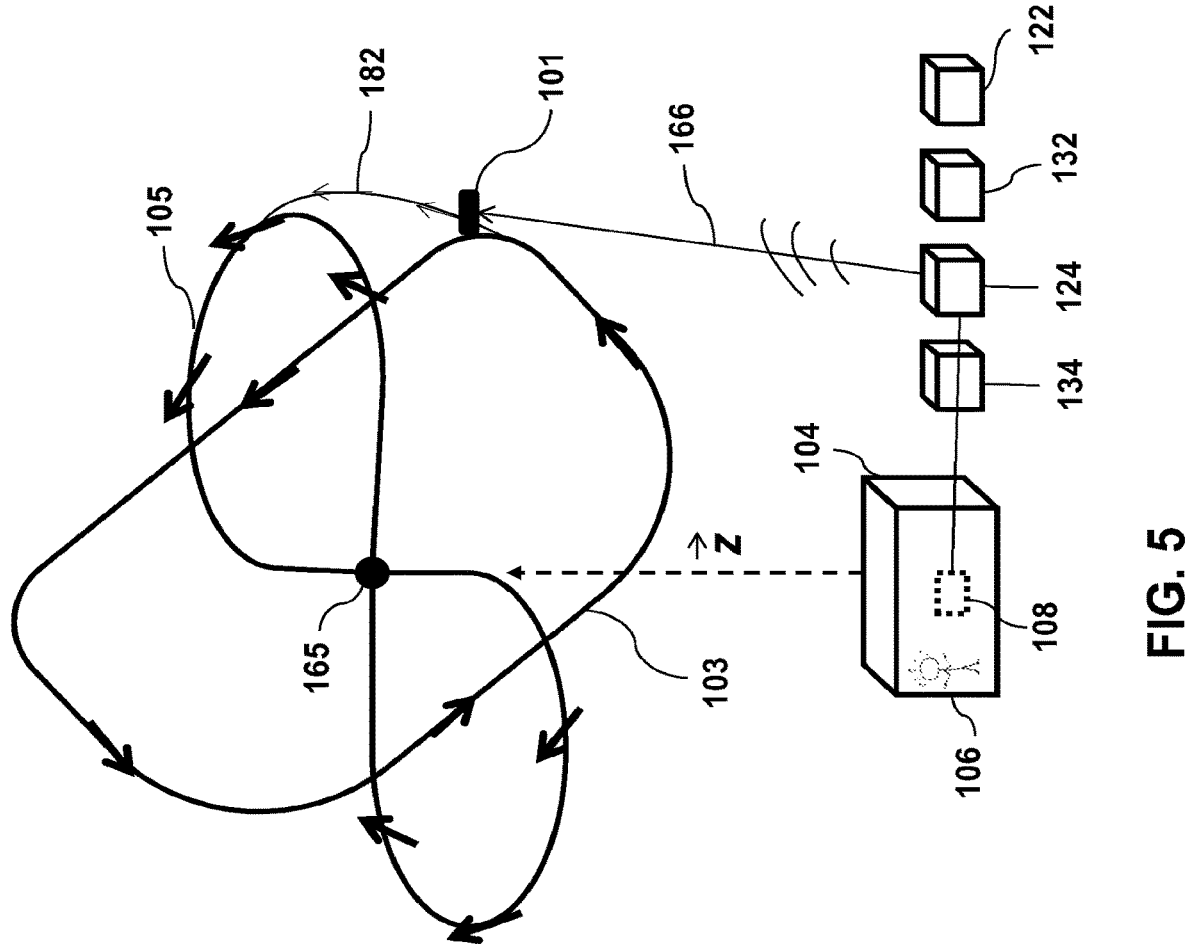
Figure 6:
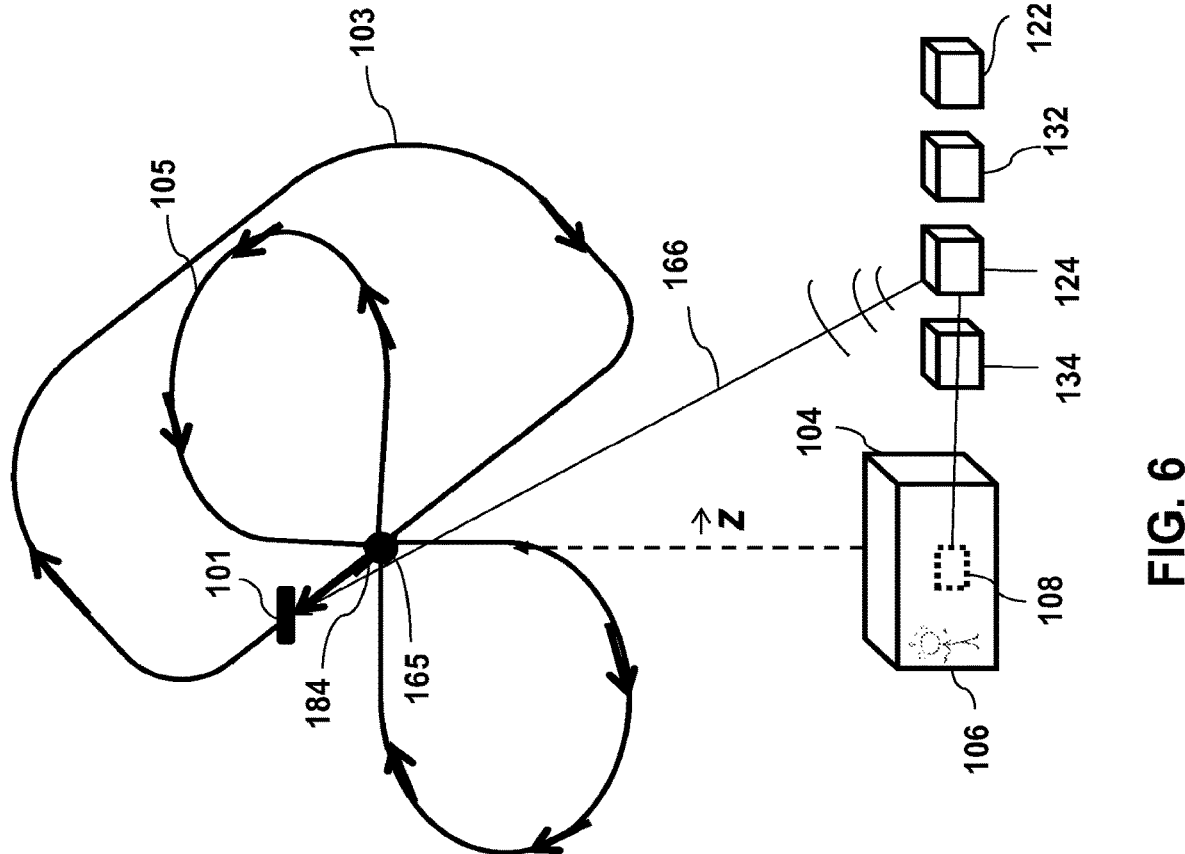
Figure 7:
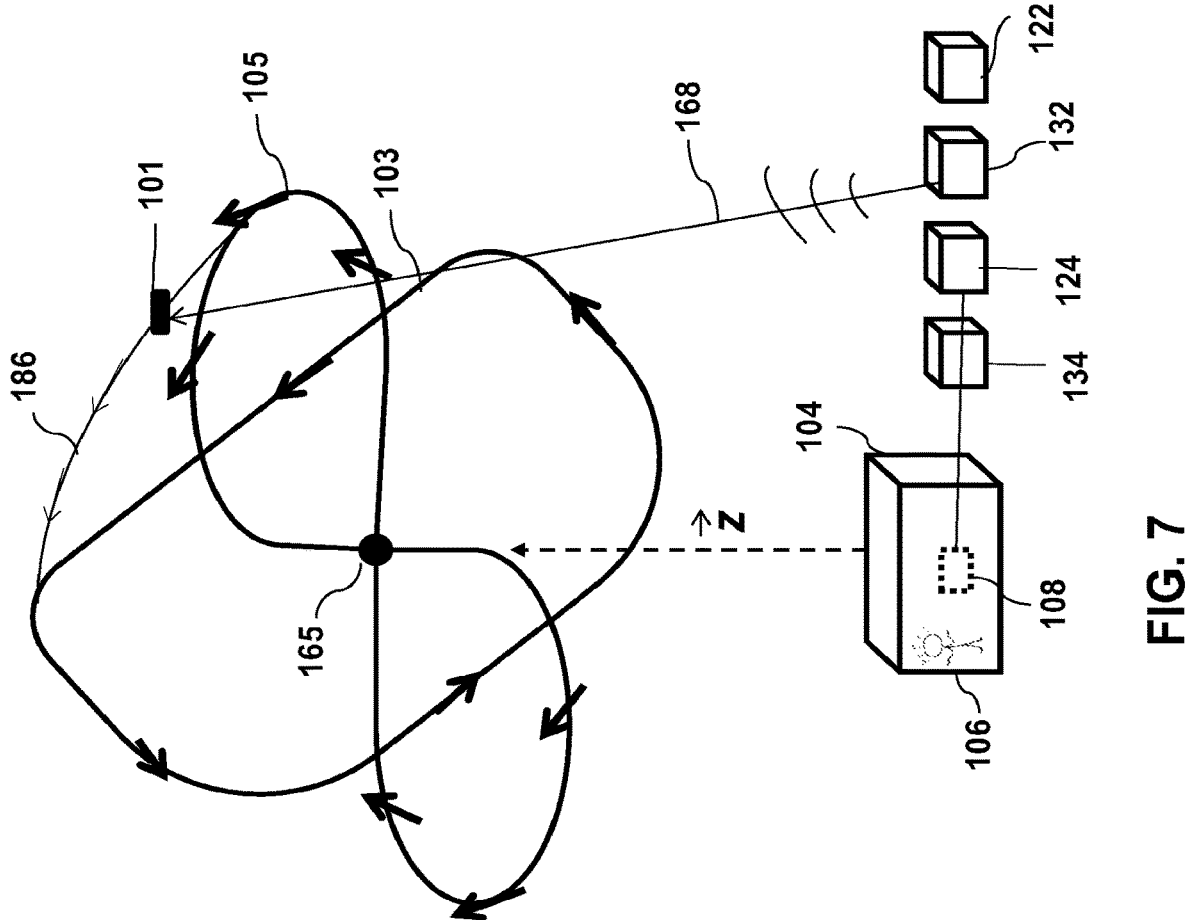
Figure 9:
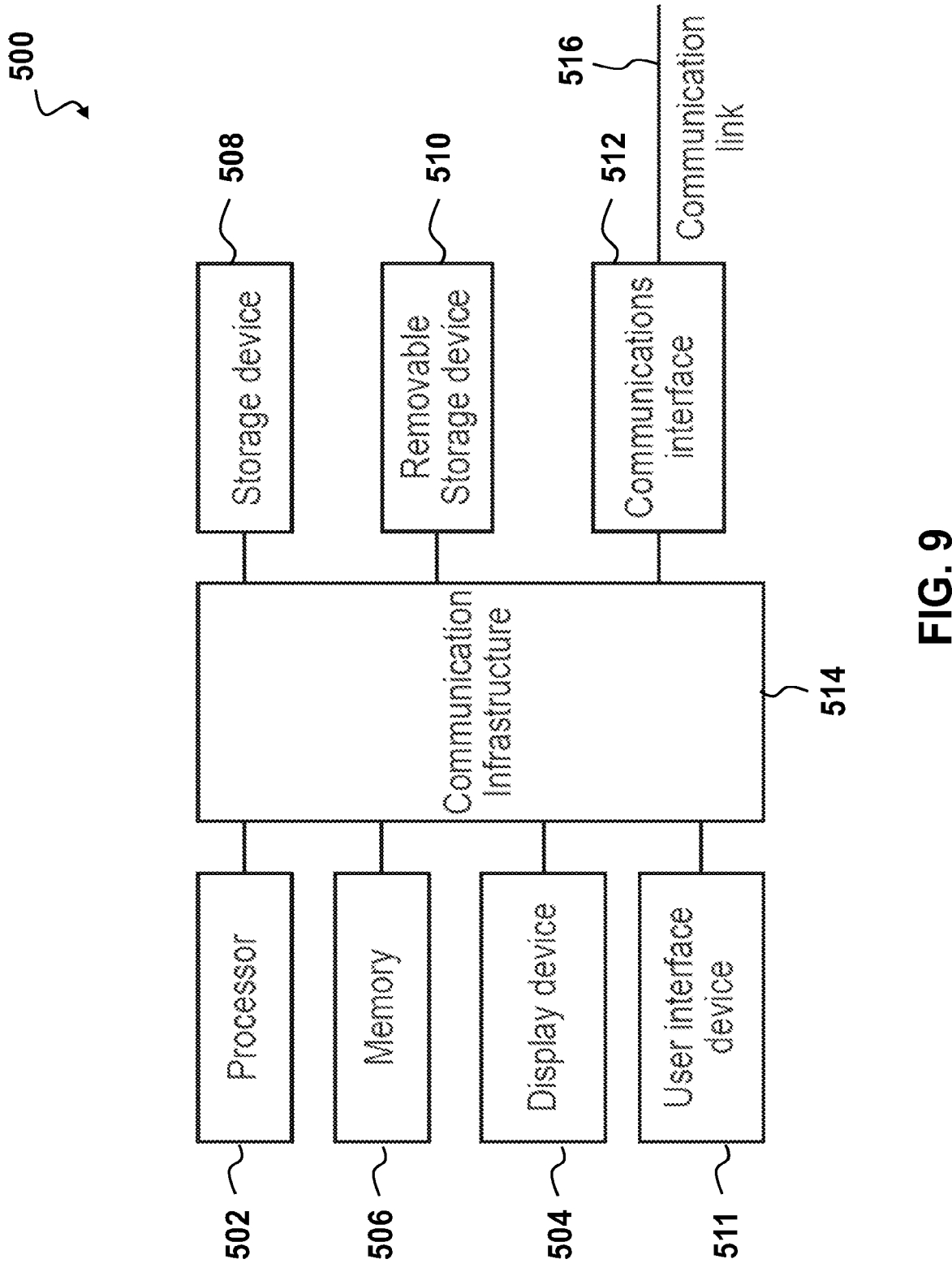
Figure 10:
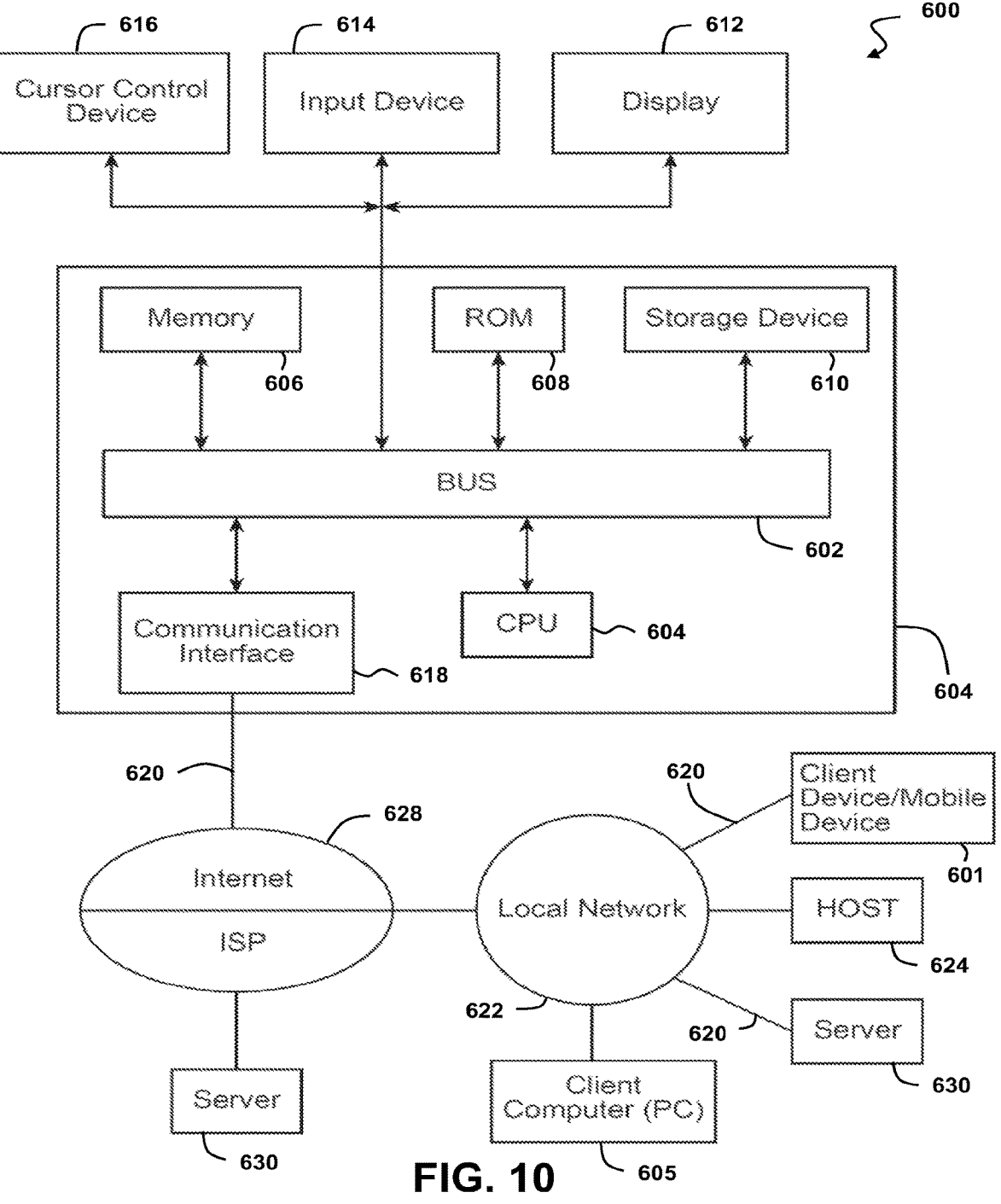
Figure 11:
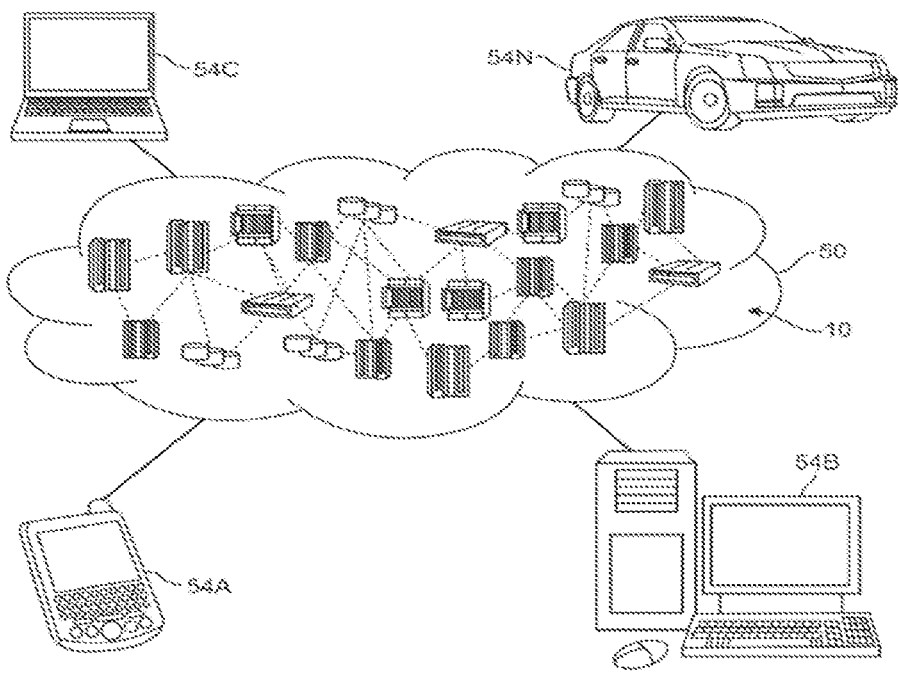

3 ments are illustrated by way of example and not limitation in the figures of the accompanying drawings, in which:

FIG. 1 depicts a system for an unmanned aerial vehicle flying in a D-loop flight pattern, according to one embodiment;

FIG. 2 illustrates a top-level functional block diagram of a computing device associated with an operator at a ground station, according to one embodiment;

FIG. 3 illustrates a top-level functional block diagram of a computing device of the unmanned aerial vehicle of FIG. 1, according to one embodiment;

FIG. 4 depicts a process for the unmanned aerial vehicle of FIG. 1 to transition from a D-loop flight pattern to a figure-eight flight pattern, according to one embodiment;

FIG. 5 depicts an alternative process for the unmanned aerial vehicle of FIG. 1 to transition from a D-loop flight pattern to a figure-eight flight pattern, according to one embodiment;

FIG. 6 depicts a process for the unmanned aerial vehicle of FIG. 1 to transition from a figure-eight flight pattern to a D-loop flight pattern, according to one embodiment;

FIG. 7 depicts an alternative process for the unmanned aerial vehicle of FIG. 1 to transition from a figure-eight flight pattern to a D-loop flight pattern, according to one embodiment;

FIG. 8 depicts a flow diagram of a method for flight plan optimization of an unmanned aerial vehicle, according to one embodiment;

FIG. 9 shows a high-level block diagram and process of a computing system for implementing an embodiment of the system and process;

FIG. 10 shows a block diagram and process of an exemplary system in which an embodiment may be implemented; and FIG. 11 depicts a cloud computing environment for implementing an embodiment of the system and process disclosed herein.

DETAILED DESCRIPTION

The following description is made for the purpose of illustrating the general principles of the embodiments discloses herein and is not meant to limit the concepts disclosed herein. Further, particular features described herein can be used in combination with other described features in each of the various possible combinations and permutations. Unless otherwise specifically defined herein, all terms are to be given their broadest possible interpretation including meanings implied from the description as well as meanings understood by those skilled in the art and/or as defined in dictionaries, treatises, etc.

A flight pattern for an unmanned aerial vehicle (UAV), such as a high altitude long endurance solar-powered aircraft, may be a D-loop. In one example, the aircraft traces a circular- or oblong-shaped pattern, referred to as a "D-loop" pattern. A D-loop flight pattern is advantageous in lower wind speeds. As wind speeds increase, the size of the D-loop must also increase, making it a challenge for the UAV to stay close to a ground station while minimizing its turn rate and bank angle. In the D-loop, the UAV is flown into the wind until is necessary to turn around. The pattern approximately forms a "D" shape, though other shapes, such as circles or ovals are possible and described below. For example, in zero winds the D-loop is a circular shape. The D-loop flight pattern is advantageous in lower wind speeds; however, as the wind speeds increase, the size of the D-loop has to increase as well. If the wind speed continues to increase, it may be desired to transition to a tighter flight pattern formation in order to station keep.

In one embodiment, as the wind speed approaches approximately 40% of flight speed, the aircraft may transition to a figure-eight loop. The figure-eight loop allows the aircraft to stay in a compact flight pattern over the ground station, with the intersect point of the figure-eight positioned approximately above the ground control station.

As wind speeds increase it is a challenge to transition from a D-loop to a figure-eight loop. More specifically, every time the UAV approaches or passes through the intersect point a decision may be made as to what type of loop to fly. When transitioning, it may be desired to minimize the bank angle because the payload may not be on gimbals. Thus, when the plane tilts, the antenna beams tilt, and the aircraft beams may need to be redirected. Alternatively, the antenna beams may be designed to have a wider angle, which may reduce signal strength at ground control stations.

In one embodiment, as the UAV travels in low winds and traces out a D-loop flight pattern, a portion of the D-loop flight pattern passes through what would be the intersect point of the figure-eight pattern. If the winds are at or above approximately 40% of flight speed, the aircraft may bank out of the D-loop at the intersect point, and transition into the figure-eight loop pattern. In another embodiment, the aircraft D-loop flight pattern does not pass directly through the intersect point of the figure-eight flight pattern. Rather, if the winds are at or above 40% of flight speed, the aircraft may veer from its D-shape trajectory towards what will be the point of the figure-eight where the aircraft is flying directly into the wind. A potential benefit of this method is the ability for gradual banking maneuvers of the UAV as the UAV transitions between flight patterns. In both embodiments, it is possible that as the winds die down, the aircraft may exit the figure-eight loop and transition back to the D-loop.

With reference to FIG. 1, a system 100 flight plan optimization of an unmanned aerial vehicle (UAV) 101 is illustrated. UAVs are aircraft with no onboard pilot and may fly autonomously or remotely. In one embodiment, the UAV 101 is a High Altitude Long Endurance aircraft. The UAV 101 may have between one and forty motors, and a wingspan between 100 feet and 400 feet. In one embodiment, the UAV 101 may have a wingspan of approximately 260 feet and may be propelled by ten electric motors powered by a solar array covering at least a portion of the surface of the wing, resulting in zero emissions. Flying at an altitude of approximately 65,000 feet above sea level and above the clouds, the UAV 101 is designed for continuous, extended missions of up to months without landing. In another embodiment, the UAV 101 may fly at 60,000 feet above sea level.

The UAV 101 functions optimally at high altitude due at least in part to the lightweight payload of the UAV. The UAV 101 is capable of considerable periods of sustained flight without recourse to land. In one embodiment, the UAV 101 may weigh approximately 3,000 lbs and may include wing panel sections and a center panel, providing for efficient assembly and disassembly of the UAV 101 due to the attachability and detachability of the wing panel sections to each other and/or to the center panel.

The UAV 101 may fly in a large, sweeping geostationary pattern within the stratospheric layer over at least one ground control station 104, taking advantage of wind patterns at high altitude. In one embodiment, a D-loop flight pattern approximately forms a "D" shape. The D-loop will trace out the shape of a "D" by flying directly into the wind, then performing a constant-rate 360 degree turn until the UAV 101 again points into the wind. In one embodiment, the flight pattern is a circular flight pattern when zero winds are present. In one embodiment, there may be more than one ground control station 104.

The ground control station 104 may be the central hub for aircraft control. The UAV 101 may be within a beam width of a terrestrial GPS receiver 134 associated with the ground control station 104. The GPS receiver 134 may be configured to provide the position of the ground control station 104 and a landing site to operators 106 at the ground control station 104 and to the UAV 101. Each UAV may include a dedicated GPS receiver for calculating the position of the UAV and may communicate an associated position data to the ground control station 104 over a terrestrial RF receiver 132 in communication with the ground control station 104.

A terrestrial RF emitter 124 may emit signals to the UAV 101 so the UAV 101 will know the location of the ground control station 104 and/or a landing site. Other emitters configured for terrestrial communication with the UAV 101 may be included, such as a visual band emitter 122. In one embodiment, the terrestrial RF emitter 124 may emit signals to the UAV 101 to generally communicate commands to the UAV 101. In some embodiments, the ground control station 104 may include the terrestrial GPS receiver 134, terrestrial RF emitter 124, terrestrial RF receiver 132, and/or visual band emitter 122. In other embodiments, the ground control station 104 may be in communication with the terrestrial GPS receiver 134, terrestrial RF emitter 124, terrestrial RF receiver 132, and/or visual band emitter 122.

In one embodiment, one or more operators 106 may be located at the ground control station 104 for optimization of the UAV 101 flight pattern. More than one operator is possible for optimization of the UAV 101 flight pattern. The operator 106 may control the transition of the UAV 101 from one flight pattern to another flight pattern via at least one processor of the ground control station 104 and/or at least one processor of the UAV 101. The transition between flight patterns may be based primarily on the wind speed. In some embodiments, the transition between flight patterns may be automatic based on one or more criteria, such as wind speed, UAV location, and the like.

At low wind speeds, for example zero to thirty knots, the UAV 101 may trace the "D-loop" shape flight pattern 103. The D-loop flight pattern 103 is advantageous in lower wind speeds. As the wind speeds increase, the size of the D-loop has to increase as well, making it a challenge for the UAV 101 to station keep. If the wind speed continues to increase, the operator 106 may cause the UAV 101 to transition to a tighter flight pattern in order to station keep, as will be described in detail below. Still further, the operator 106 may cause the UAV 101 to transition back to the D-loop 103 as the ambient wind speed lowers or dies down.

While the operator 106 is depicted as a person, the operator 106 may be a processor having addressable memory, such as shown in FIG. 2. The control of the UAV 101 and/or change of flight pattern of the UAV 101 may be via the operator 106 in some embodiments. In other embodiments, control of the UAV 101 and/or change of flight pattern of the UAV 101 may be via the ground control 104, an autonomous system, a semi-autonomous system, or the like.

FIG. 2 illustrates an example of a top-level functional block diagram of a computing device 108 operated by the operator 106. The computing device 108 comprises a processor 138, such as a central processing unit (CPU), addressable memory 140, an external device interface 142, e.g., an optional universal serial bus port and related processing, and/or an Ethernet port and related processing, and an optional user interface 144, e.g., an array of status lights and one or more toggle switches, and/or a display, and/or a keyboard and/or a pointer-mouse system and/or a touch screen. Optionally, the addressable memory may, for example, be: flash memory, eprom, and/or a disk drive or other hard drive. These elements may be in communication with one another via a data bus 146. In some embodiments, via an operating system 148 such as one supporting a web browser 150 and applications 152, the processor 138 may be configured to execute steps of a process establishing a communication channel. For example, the processor 138 may be in communication with the RF receiver 132 to process the received position data of the UAV 101.

Since a UAV does not have an onboard pilot, a flight control computer (FCC) 110 onboard the UAV is the central intelligence of the aircraft. The FCC 110 may partially or completely control much of the functionality of the UAV, such as changing direction (e.g., flight pattern) based on commands received from the operator 106. The functionality of the UAV may also be completely or partially controlled by a ground control station.

FIG. 3 illustrates an example of a top-level functional block diagram of the FCC 110 of the UAV 101. The FCC 110 comprises at least a processor 114, such as a central processing unit (CPU), addressable memory 154, an external device interface 156, e.g., an optional universal serial bus port and related processing, and/or an Ethernet port and related processing, and an optional user interface, e.g., an array of status lights, sensors and one or more toggle switches. Optionally, the addressable memory may, for example, be: flash memory, eprom, and/or a disk drive or other hard drive. These elements may be in communication with one another via a data bus 160. In one embodiment, the FCC 110 may have a suite of sensors for measuring the current flight status and health status of the aircraft.

In some embodiments, via an operating system 162 such as one supporting applications 164, the processor 114 may be configured to execute steps of a process establishing a communication channel. For example, the processor 114 may be in communication with a receiver 112 configured to receive a command signal from the computing device 108. In one embodiment, the command signal is a transition command signal received by the receiver 112, and the processor executes steps to cause the UAV 101 to transition from a current flight pattern to a different flight pattern. In another embodiment, the command signal is an exit command signal received by the receiver 112, and the processor 114 executes steps to cause the UAV 101 to exit out of the new flight pattern and transition back to the original flight pattern, such as the original flight pattern 103.

The FCC 110 may further be connected to or in communication with a global positioning system (GPS) configured for receiving position data from a constellation of satellites. Still further, the FCC 110 may include a transmitter 116 for transmitting to the ground GPS correction information and/or transmitting to the ground translated GPS position in an auxiliary frequency band to a terrestrial RF receiver 132.

With respect to FIG. 4, two flight patterns are illustrated. In one embodiment, the UAV 101 may fly in a first flight pattern 103. In one embodiment, the first flight pattern 103 may be a D-loop. More specifically, the UAV 101 will trace out the shape of a "D" by flying directly into the wind and then performing a constant-rate 360 degree turn until the UAV 101 again points into the wind. The UAV 101 may fly the first flight pattern 103 when wind speeds are low. In another embodiment, the UAV 101 may fly the first flight pattern 103 in the opposite, counter-clockwise direction. The UAV 101 may generally station keep with the ground control station 104, flying at high altitude, e.g., approximately 65,000 ft above sea level, above the ground control station 104 as denoted by the z vector. The center point of the D-loop 103 may be directly above the ground control station 104. The UAV 101 may also trace a second flight pattern 105, such as a figure-eight flight pattern, when winds speeds are at or above approximately 40% of flight speed. When winds increase to at or above approximately 40% of flight speed, the size of the D-loop flight pattern 103 increases. Specifically, the portion of the D-loop flight pattern 103 that points approximately into the wind and the portion the D-loop flight pattern 103 that points approximately down-wind will increase; however, the portions of the D-loop flight pattern 103 that are approximately perpendicular to the wind direction do not increase. Thus, the D-loop flight pattern 103 may not get wider; the D-loop flight pattern 103 may get longer. The total distance that the UAV 101 travels away from the defined center point, such as intersect point 165 described below, of the ground control station 104 above 40% wind speed is minimized by using the figure eight flight pattern 105. The figure-eight flight pattern 105 provides for a tighter flight path of the UAV 101, allowing the UAV 101 to generally be closer to the ground control station 104 than the D-loop pattern 103.

The figure-eight flight pattern 105 may have an intersect point 165 that the UAV 101 passes through each time the UAV 101 traces the full second flight pattern 105. The second or figure-eight flight pattern 105 further allows the UAV 101 to travel in high wind speeds while minimizing the distance the UAV 101 travels from the intersect point 165. In one embodiment, the intersect point 165 is located approximately directly above the ground control station 104.

Arrows indicate the direction of the UAV 101 as the UAV 101 travels through each flight pattern 103, 105. The first flight pattern 103 may pass through the intersect point 165 as the UAV 101 traces the first flight pattern 103. If the wind speed 101 increases to at or above approximately 40% of flight speed, the UAV 101 may bank out of the first flight pattern 103 at the intersect point 165, and transition into the figure-eight loop pattern 105, as shown by reference element 180. In one embodiment, a transition command signal 166 may be sent from the operator 106, or a computing device of the ground control station 104, to an FCC of the UAV 101 to change the trajectory of the UAV 101 and transition from the first flight pattern 103 to the second flight pattern or figure-eight loop 105. In one embodiment, the transition command signal 166 may be a set of spatial coordinates for the FCC of the UAV 101 to follow.

The wind speed may be measured at the UAV 101 in some embodiments. In other embodiments, external sensors may be used to measure the wind speed. In other embodiments, multiple UAVs may be used and the wind speed measurements at the one or more UAVs may be recorded and transmitted to at least one other UAV of the multiple UAVs. The threshold for wind speed may be based on an average wind speed, such as an average wind speed throughout a flight path of the UAV 101. The point of transition between the different patterns 103, 105 may depend on several factors, as disclosed herein. The transition between the different patterns 103, 105 may be commanded by a computer on the ground in the ground control station in some embodiments. In other embodiments, the transition between the different patterns 103, 105 may be could be determined autonomously by the flight control computer of the UAV.

The shape of the D-loop first flight pattern 103 may be based on the point of reference of the aircraft and the wind. The D-loop first flight pattern 103 is only shown for reference and is not drawn to scale or shape. In one embodiment, a downwind straight section of the D-loop first flight pattern 103 may be much shorter, or non-existent, than the leg as shown in the figures. In embodiments where the D-loop first flight pattern 103 comprises a constant rate 360 degree turn there may not be any straight downwind leg as the flight path may be a continuous elongated turn. In some embodiments, the D-loop first flight pattern 103 comprises a straight leg, such as the leg into the wind and a turning leg where the UAV 101 makes a long turn before transitioning back into the straight leg.

In some embodiments, the transition between patterns 103, 105 may be based on a desired proximity to the desired loiter point. For example, a transition may be selected that does not cause the UAV 101 to go outside of a set threshold distance from the loiter point or ground control station. In some embodiments, the transition between patterns 103, 105 may be based on other aircraft or UAVs in the constellation. For example, the transition may depend on the position, battery level, and the like of other UAV so as to prioritize transitions for aircraft with lower battery levels, maintain a desired distance between aircraft, and the like. In some embodiments, the transition between patterns 103, 105 may be based on a time of day. For example, the transition may be based on a location of the Sun relative to the wind, especially closer to sunrise and sunset when certain flight patterns may limit absorption of solar energy. In some embodiments, the transition between patterns 103, 105 may be based on a time of year. For example, in winter there may be less time between sunrise and sunset for each UAV 101 to recharge and the transition may consider a sun angle relative to a desired pattern and/or transition so that the UAV 101 may continue to receive solar energy if needed. In some embodiments, the transition and/or selected pattern 103,105 may consider the solar energy that can be used to charge the UAV in each flight pattern 103, 105 as compared to an extra energy needed to fly a non-optimal flight pattern 103, 105.

The transition command signal 166 may be communicated to the RF emitter 124 from the processor of the ground control station 104. The RF emitter 124 transmits the signal 166 to be received at the UAV 101. The signal 166 may be a wireless radio frequency signal. Furthermore, the receiver 112 of the FCC 110, as shown in FIG. 3, may be tuned to the same frequency as the RF emitter 124. In one embodiment, the transition command signal 166 has a unique identifier code for the particular UAV that the transition command signal 166 is in communication with, such as UAV 101, to make sure the signal is not sent to other UAV if there are other UAVs in the vicinity. Upon receiving the transition command signal 166 at the FCC 110 of the UAV 101, the FCC 110 causes the UAV 101 to turn into the figure-eight flight pattern 105 as the UAV 101 passes through the intersection point 165.

With respect to FIG. 5, the first flight pattern 103 and the figure-eight or second flight pattern 105 of FIG. 4 are shown, wherein the intersect point 165 of the figure-eight loop 105 is approximately located at the center of the D-loop 103. If the wind speed increases to at or above approximately 40% of flight speed, the operator 106 or a processor of the ground control station 104 transmits the transition command signal 166 to cause the UAV 101 to gradually veer out of the D-loop 103, and follow a flight path denoted by connecting flight path 182. The UAV 101 passes through the intersect point 165 and follows the new figure-eight path 105. The gradual transition of the connecting flight path 182 allows for a constant turn rate over much of the D-loop 103, and more gradual banking maneuvers as the UAV 101 transitions between flight patterns.

As described above, and with respect to FIG. 6, the figure-eight flight pattern 105 allows the UAV 101 to travel in high wind speeds while station keeping above the ground control station 104. The figure-eight or second flight pattern 105 further allows the UAV 101 to minimize the distance travelled from the intersect point 165. If the wind speed 101 decreases to below approximately 40% of flight speed, the UAV 101 may bank out of the figure-eight loop 103 at the intersect point 165, and transition into the D-loop pattern 105 via connecting flight path 184. In one embodiment, an exit command signal 168 is sent from the operator 106 or a processor of the ground control station 104 to the FCC of the UAV 101 to change the trajectory of the UAV 101 to exit from the figure-eight loop 105 back to the D-loop 103. The exit command signal 168 may be a new set of spatial coordinates for the UAV 101 to follow.

The exit command signal 168 is communicated to the RF emitter 124, and the RF emitter emits the signal 168 to be received at the UAV 101. The exit command signal 168 may be a wireless radio frequency signal. Furthermore, the receiver 112 of the FCC 110 may be tuned to the same frequency as the RF emitter 124. In one embodiment, the exit command signal 168 has a unique identifier code for the particular aircraft it is in communication with, such as UAV 101, to make sure the signal is not sent to other aircraft if there are other UAVs in the vicinity. Upon receiving the exit command signal 168 at the FCC 110 of the UAV 101, the FCC 110 causes the UAV 101 to turn into the figure-eight flight pattern 105 as the UAV 101 passes through the intersection point 165.

With respect to FIG. 7, the D-loop or first flight pattern 103 and the figure-eight or second flight pattern 105 of FIG. 5 are shown. In one embodiment, if the wind speed 101 decreases to below approximately 40% of flight speed, the operator 106 or a processor 104 of the ground control station 104 transmits the exit command signal 168 to cause the UAV 101 to pass through the intersect point 165 and follow a flight path denoted by a gradual transition of the connecting flight path 186 to follow the D-loop flight pattern 103. The gradual transition of the connecting flight path 186 allows for a constant turn rate over much of the D-loop 103, and more gradual banking maneuvers as the UAV 101 transitions between flight patterns.

With respect to FIG. 8, a flowchart for a method 200 for flight plan optimization of an unmanned aerial vehicle (UAV) is illustrated. The UAV may trace a first flight pattern when winds speeds are below approximately 40% of the UAV flight speed (step 202). In one embodiment, the UAV will trace out the shape of a "D" by flying directly into the wind, then performing a constant-rate 360 degree turn until the UAV again points into the wind. The UAV may fly this D-loop flight pattern when wind speeds are low. An operator or processor of a ground control station may transmit a transition command signal to change the trajectory of the UAV when the wind speed is at or above approximately 40% of the UAV flight speed (step 204). While 40% of the UAV flight speed is used as an example, other set thresholds are possible and contemplated relative to the UAV flight speed. The set threshold amount may be based on the UAV dimensions, available battery power, weather conditions, or the like. A flight control computer (FCC) of the UAV may receive the transition command signal (step 206). The FCC may execute steps to transition the UAV out of the first flight pattern (e.g., at an intersect point), and into a second flight pattern (step 208). In one embodiment, the second flight pattern is a figure-eight loop pattern. In one embodiment, the transition command signal may be a set of spatial coordinates for the UAV to follow. The figure-eight flight pattern allows the UAV to travel in high wind speeds and still station keep above a ground station.

The operator or processor may transmit an exit command signal to change the trajectory of the UAV when the wind speed is below approximately 40% of the UAV flight speed (step 210). The FCC receives the exit command signal (step 212). The FCC may execute steps to transition the UAV out of the second flight pattern, and back into the first flight pattern based on the received exit command signal (step 214). In one embodiment, the exit command signal may be a new set of spatial coordinates for the UAV to follow. In one embodiment, the exit command signal is communicated to a radio frequency (RF) emitter by the operator, and the RF emitter emits the signal to be received at the UAV FCC.

In one embodiment, if the wind speed decreases to below approximately 40% of flight speed, the UAV may bank out of the figure-eight loop at the intersect point, and gradually transition into the D-loop pattern via a connecting flight path. The gradual transition allows for a constant turn rate over much of the D-loop, and more gradual banking maneuvers as the UAV transitions between the first and second flight patterns.

FIG. 9 is a high-level block diagram 500 showing a computing system comprising a computer system useful for implementing an embodiment of the system and process, disclosed herein. Embodiments of the system may be implemented in different computing environments. The computer system includes one or more processors 502, and can further include an electronic display device 504 (e.g., for displaying graphics, text, and other data), a main memory 506 (e.g., random access memory (RAM)), storage device 508, a removable storage device 510 (e.g., removable storage drive, a removable memory module, a magnetic tape drive, an optical disk drive, a computer readable medium having stored therein computer software and/or data), user interface device 511 (e.g., keyboard, touch screen, keypad, pointing device), and a communication interface 512 (e.g., modem, a network interface (such as an Ethernet card), a communications port, or a PCMCIA slot and card). The communication interface 512 allows software and data to be transferred between the computer system and external devices. The system further includes a communications infrastructure 514 (e.g., a communications bus, cross-over bar, or network) to which the aforementioned devices/modules are connected as shown.

Information transferred via communications interface 514 may be in the form of signals such as electronic, electromagnetic, optical, or other signals capable of being received by communications interface 514, via a communication link 516 that carries signals and may be implemented using wire or cable, fiber optics, a phone line, a cellular/mobile phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments have been described with reference to flowchart illustrations and/or block diagrams of methods, apparatus (systems) and computer program products according to embodiments. Each block of such illustrations/diagrams, or combinations thereof, can be implemented by computer program instructions. The computer program instructions when provided to a processor produce a machine, such that the instructions, which execute via the processor, create means for implementing the functions/ operations specified in the flowchart and/or block diagram. Each block in the flowchart/block diagrams may represent a hardware and/or software module or logic, implementing embodiments. In alternative implementations, the functions noted in the blocks may occur out of the order noted in the figures, concurrently, etc.

Computer programs (i.e., computer control logic) are stored in main memory and/or secondary memory. Computer programs may also be received via a communications interface 512. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system.

FIG. 10 shows a block diagram of an example system 600 in which an embodiment may be implemented. The system 600 includes one or more client devices 601 such as consumer electronics devices, connected to one or more server computing systems 630. A server 630 includes a bus 602 or other communication mechanism for communicating information, and a processor (CPU) 604 coupled with the bus 602 for processing information. The server 630 also includes a main memory 606, such as a random access memory (RAM) or other dynamic storage device, coupled to the bus 602 for storing information and instructions to be executed by the processor 604. The main memory 606 also may be used for storing temporary variables or other intermediate information during execution or instructions to be executed by the processor 604. The server computer system 630 further includes a read only memory (ROM) 608 or other static storage device coupled to the bus 602 for storing static information and instructions for the processor 604. A storage device 610, such as a magnetic disk or optical disk, is provided and coupled to the bus 602 for storing information and instructions. The bus 602 may contain, for example, thirty-two address lines for addressing video memory or main memory 606. The bus 602 can also include, for example, a 32-bit data bus for transferring data between and among the components, such as the CPU 604, the main memory 606, video memory and the storage 610. Alternatively, multiplex data/address lines may be used instead of separate data and address lines.

The server 630 may be coupled via the bus 602 to a display 612 for displaying information to a computer user. An input device 614, including alphanumeric and other keys, is coupled to the bus 602 for communicating information and command selections to the processor 604. Another type or user input device comprises cursor control 616, such as a mouse, a trackball, or cursor direction keys for communicating direction information and command selections to the processor 604 and for controlling cursor movement on the display 612.

According to one embodiment, the functions are performed by the processor 604 executing one or more sequences of one or more instructions contained in the main memory 606. Such instructions may be read into the main memory 606 from another computer-readable medium, such as the storage device 610. Execution of the sequences of instructions contained in the main memory 606 causes the processor 604 to perform the process steps described herein.

One or more processors in a multi-processing arrangement may also be employed to execute the sequences of instructions contained in the main memory 606. In alternative embodiments, hard-wired circuitry may be used in place of or in combination with software instructions to implement the embodiments. Thus, embodiments are not limited to any specific combination of hardware circuitry and software.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor multi-core processor to perform the features of the computer system. Accordingly, such computer programs represent controllers of the computer system.

Generally, the term "computer-readable medium" as used herein refers to any medium that participated in providing instructions to the processor 604 for execution. Such a medium may take many forms, including but not limited to, non-volatile media, volatile media, and transmission media. Non-volatile media includes, for example, optical or magnetic disks, such as the storage device 610. Volatile media includes dynamic memory, such as the main memory 606. Transmission media includes coaxial cables, copper wire and fiber optics, including the wires that comprise the bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 604 for execution. For example, the instructions may initially be carried on a magnetic disk of a remote computer. The remote computer can load the instructions into its dynamic memory and send the instructions over a telephone line using a modem. A modem local to the server 630 can receive the data on the telephone line and use an infrared transmitter to convert the data to an infrared signal. An infrared detector coupled to the bus 602 can receive the data carried in the infrared signal and place the data on the bus 602. The bus 602 carries the data to the main memory 606, from which the processor 604 retrieves and executes the instructions. The instructions received from the main memory 606 may optionally be stored on the storage device 610 either before or after execution by the processor 604.

The server 630 also includes a communication interface 618 coupled to the bus 602. The communication interface 618 provides a two-way data communication coupling to a network link 620 that is connected to the world wide packet data communication network now commonly referred to as the Internet 628. The Internet 628 uses electrical, electromagnetic or optical signals that carry digital data streams. The signals through the various networks and the signals on the network link 620 and through the communication interface 618, which carry the digital data to and from the server 630, are exemplary forms or carrier waves transporting the information.

In another embodiment of the server 630, interface 618 is connected to a network 622 via a communication link 620. For example, the communication interface 618 may be an integrated services digital network (ISDN) card or a modem to provide a data communication connection to a corresponding type of telephone line, which can comprise part of the network link 620. As another example, the communication interface 618 may be a local area network (LAN) card to provide a data communication connection to a compatible LAN. Wireless links may also be implemented. In any such implementation, the communication interface 618 sends and receives electrical electromagnetic or optical signals that carry digital data streams representing various types of information.

The network link 620 typically provides data communication through one or more networks to other data devices. For example, the network link 620 may provide a connection through the local network 622 to a host computer 624 or to data equipment operated by an Internet Service Provider (ISP). The ISP in turn provides data communication services through the Internet 628. The local network 622 and the Internet 628 both use electrical, electromagnetic or optical signals that carry digital data streams. The signals through the various networks and the signals on the network link 620 and through the communication interface 618, which carry the digital data to and from the server 630, are exemplary forms or carrier waves transporting the information.

The server 630 can send/receive messages and data, including e-mail, program code, through the network, the network link 620 and the communication interface 618. Further, the communication interface 618 can comprise a USB/Tuner and the network link 620 may be an antenna or cable for connecting the server 630 to a cable provider, satellite provider or other terrestrial transmission system for receiving messages, data and program code from another source.

The example versions of the embodiments described herein may be implemented as logical operations in a distributed processing system such as the system 600 including the servers 630. The logical operations of the embodiments may be implemented as a sequence of steps executing in the server 630, and as interconnected machine modules within the system 600. The implementation is a matter of choice and can depend on performance of the system 600 implementing the embodiments. As such, the logical operations constituting said example versions of the embodiments are referred to for e.g., as operations, steps or modules.

Similar to a server 630 described above, a client device 601 can include a processor, memory, storage device, display, input device and communication interface (e.g., e-mail interface) for connecting the client device to the Internet 628, the ISP, or LAN 622, for communication with the servers 630.

The system 600 can further include computers (e.g., personal computers, computing nodes) 605 operating in the same manner as client devices 601, where a user can utilize one or more computers 605 to manage data in the server 630.

Referring now to FIG. 11, illustrative cloud computing environment 50 is depicted. As shown, cloud computing environment 50 comprises one or more cloud computing nodes 10 with which local computing devices used by cloud consumers, such as, for example, personal digital assistant (PDA), smartphone, smart watch, set-top box, video game system, tablet, mobile computing device, or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention herein disclosed by way of examples should not be limited by the particular disclosed embodiments described above.

What is claimed is:

1. A system, comprising:

at least one unmanned aerial vehicle (UAV);

at least one flight control computer (FCC) associated with each UAV of the at least one UAV, wherein the FCC controls movement of said each UAV of the at least one UAV;

at least one computing device associated with a ground control station, wherein the at least one computing device is in communication with the at least one FCC;

wherein the at least one FCC maintains a first station-keeping flight pattern of a respective UAV of the at least one UAV above the ground control station, wherein the first station-keeping flight pattern comprises a D-loop flight pattern;

wherein the at least one computing device is configured to: determine whether a wind speed exceeds a set threshold that is a predetermined percentage of a current flight speed of the respective UAV of the at least one UAV, and transmit a transition signal comprising a set of spatial coordinates to the at least one FCC to transition the respective UAV of the at least one UAV from the first station-keeping flight pattern to a second station-keeping flight pattern in response to the determination that the wind speed exceeds the set threshold, wherein the second station-keeping flight pattern comprises a figure-eight flight pattern; and wherein the at least one computing device is further configured to: generate a connecting flight path between the first station-keeping flight pattern and the second station-keeping flight pattern that allows for a constant turn rate over most of the connecting flight path and more gradual banking maneuvers as the respective UAV of the at least one UAV transitions between the first and second station-keeping flight patterns, and wherein the transition between the first and second station-keeping flight patterns occurs proximate an intersect point located at a center of the D-loop flight pattern above the ground control station; and wherein the at least one computing device is further configured to, in response to the wind speed falling below the set threshold relative to the flight speed, transmit an exit command signal comprising the set of spatial coordinates to follow to transition the respective UAV of the at least one UAV from the figure-eight flight pattern back to the D-loop flight pattern.

2. The system of claim 1, wherein the set threshold is also based on UAV dimensions, available battery power, and weather conditions.

3. The system of claim 1, wherein the at least one computing device is configured to transmit the exit command signal to the at least one FCC to transition the respective UAV of the at least one UAV from the second station-keeping flight pattern to the first station-keeping flight pattern in response to the wind speed falling below the set threshold relative to the flight speed of the respective UAV of the at least one UAV, wherein the exit command signal comprises a set of spatial coordinates for the FCC of the respective UAV of the at least one UAV to follow.

4. The system of claim 3, wherein the set threshold is 40% of the flight speed.

5. A method comprising:

maintaining, by at least one flight control computer (FCC) associated with each unmanned aerial vehicle (UAV) of one or more UAVs, a first station-keeping flight pattern above a ground control station, wherein the FCC controls movement of said each UAV of the one or more UAVs, and wherein the first station-keeping flight pattern comprises a D-loop flight pattern;

determining whether a wind speed exceeds a set threshold that is a predetermined percentage of a current flight speed of the respective UAV of the one or more UAVs;

transmitting, by at least one computing device associated with the ground control station, a transition signal comprising a set of spatial coordinates to the at least one FCC in response to the determined wind speed exceeding the set threshold, transitioning, by the at least one FCC associated with the respective UAV of the one or more UAVs, the respective UAV from the first flight station-keeping pattern to a second station-keeping flight pattern via a connecting flight path, wherein the second station-keeping flight pattern comprises a figure-eight flight pattern, wherein the connecting flight path allows for a constant turn rate over most of the connecting flight path and more gradual banking maneuvers as the respective UAV of the one or more UAVs transitions between the first and second station-keeping flight patterns, and wherein the transition between the first and second station-keeping flight patterns occurs proximate an intersect point located at a center of the D-loop flight pattern above the ground control station; and transmitting, by the at least one FCC associated with the respective UAV of the one or more UAVs, an exit command signal in response to the wind speed falling below the set threshold relative to the flight speed, wherein the exit command signal comprises the set of spatial coordinates to follow to transition the respective UAV of the one or more UAVs from the figure-eight flight pattern back to the D-loop flight pattern.

6. The method of claim 5, wherein the set threshold is also based on UAV dimensions, available battery power, and weather conditions.

7. The method of claim 5, further comprising:

transitioning, by the at least one FCC associated with the respective UAV of the one or more UAVs, the respective UAV from the second station-keeping flight pattern to the first station-keeping flight pattern;

wherein the exit command signal comprises a set of spatial coordinates for the FCC of the respective UAV of the one or more UAVs to follow.

8. The method of claim 7, wherein the set threshold is 40% of the flight speed.

* * * * *